United States Patent
Rodriquez-Valderrama et al.

(10) Patent No.: US 9,595,112 B2
(45) Date of Patent: Mar. 14, 2017

(54) INCREMENTAL PRINCIPAL COMPONENT PURSUIT FOR VIDEO BACKGROUND MODELING

(71) Applicant: STC. UNM, Albuquerque, NM (US)

(72) Inventors: Paul A. Rodriquez-Valderrama, Barranco (PE); Brendt Wohlberg, Santa Fe, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 14/722,651

(22) Filed: May 27, 2015

(65) Prior Publication Data

US 2015/0348274 A1 Dec. 3, 2015

Related U.S. Application Data

(60) Provisional application No. 62/067,904, filed on Oct. 23, 2014, provisional application No. 62/037,685, filed on Aug. 15, 2014, provisional application No. 62/003,152, filed on May 27, 2014.

(51) Int. Cl.
*G06T 7/00* (2006.01)

(52) U.S. Cl.
CPC .......... *G06T 7/0081* (2013.01); *G06T 7/0087* (2013.01); *G06T 7/11* (2017.01); *G06T 7/143* (2017.01); *G06T 7/254* (2017.01); *G06T 7/194* (2017.01); *G06T 2207/10016* (2013.01); *G06T 2207/20081* (2013.01); *G06T 2207/20144* (2013.01)

(58) Field of Classification Search
None
See application file for complete search history.

(56) References Cited

U.S. PATENT DOCUMENTS

| | | | | |
|---|---|---|---|---|
| 7,035,467 | B2 * | 4/2006 | Nicponski | G06K 9/6269 382/190 |
| 8,867,849 | B1 * | 10/2014 | Kirkham | G06F 17/30268 382/224 |
| 2003/0235341 | A1 * | 12/2003 | Gokturk | G06K 9/00228 382/243 |
| 2006/0239558 | A1 * | 10/2006 | Rafii | G06K 9/00201 382/181 |
| 2008/0249856 | A1 * | 10/2008 | Angell | G06Q 30/0271 705/14.67 |
| 2009/0006551 | A1 * | 1/2009 | Guday | G06Q 30/02 709/204 |
| 2009/0244309 | A1 * | 10/2009 | Maison | G06K 9/00369 348/222.1 |

(Continued)

OTHER PUBLICATIONS

C. Baker, K. Gallivan, and P. Van Dooren, "Low-rank incremental methods for computing dominant singular subspaces," Linear Algebra and its Applications, vol. 436, No. 8, pp. 2866-2888, 2012.

(Continued)

*Primary Examiner* — Tsung-Yin Tsai
(74) *Attorney, Agent, or Firm* — Valauskas Corder LLC

(57) ABSTRACT

An incremental Principal Component Pursuit (PCP) algorithm for video background modeling that is able to process one frame at a time while adapting to changes in background, with a computational complexity that allows for real-time processing, having a low memory footprint and is robust to translational and rotational jitter.

11 Claims, 4 Drawing Sheets

(56) References Cited

U.S. PATENT DOCUMENTS

| | | | | |
|---|---|---|---|---|
| 2012/0246302 A1* | 9/2012 | Lafleur | ............... | G06Q 50/01 709/224 |
| 2012/0281906 A1* | 11/2012 | Appia | ............... | H04N 13/026 382/154 |
| 2013/0282808 A1* | 10/2013 | Sadanandan | ........... | G06Q 10/10 709/204 |

OTHER PUBLICATIONS

C. Qiu and N. Vaswani, "Automated recursive projected cs (ReProCS) for real-time video layering," in Int'l Recognition (CVPR), 2012.

C. Qiu and N. Vaswani, "Real-time robust principal components' pursuit," CoRR, vol. abs/1010.0608, 2010.

C. Qiu and N. Vaswani, "Support predicted modified-cs for recursive robust principal components pursuit," in IEEE International Symposium on Information Theory (ISIT), 2011.

F. Seidel, C. Hage, and M. Kleinsteuber, "pROST: a smoothed lp-norm robust online subspace tracking method for background subtraction in video," Machine Vision and Applications, vol. 25, No. 5, pp. 1227-1240, 2014.

J. He, L. Balzano, and A. Szlam, "Incremental gradient on the grassmannian for online foreground and background separation in subsampled video," in Computer Vision and Pattern Recognition (CVPR), 2012 IEEE Conference on, Jun. 2012, pp. 1568-1575.

M. Brand, "Fast low-rank modifications of the thin singular value decomposition," Linear Algebra and its Applications, vol. 415, No. 1, pp. 20-30, 2006.

P. Rodríguez and B. Wohlberg, "Fast principal component pursuit via alternating minimization," in Proc. of IEEE Int'l. Conf. on Image Proc. (ICIP), Melbourne, Australia, Sep. 2013, pp. 69-73.

P. Rodríguez and B. Wohlberg, "Video background modeling under impulse noise," accepted, 2014 IEEE Int'l. Conf. on Image Proc. (ICIP), 2014.

Y. Chahlaoui, K. Gallivan, and P. Van Dooren, "Computational information retrieval," in In Computational Information Retrieval, chapter An Incremental Method for Computing Dominant Singular Spaces, pp. 53-62. SIAM, 2001.

* cited by examiner

Inputs : Observed video $D \in \mathbb{R}^{m \times n}$, regularization parameter $\lambda$, eigen-value tolerance $\tau$.
Initialization: $S_0 = 0$, initial rank $r$.
for $j = 0 : mLoops$ do

1. $\quad [U, \Sigma, V] = \text{partialSVD}(D - S^{(j)}, r)$
2. $\quad L^{(j+1)} = U * \Sigma * V$
3. $\quad \text{if } \frac{\sigma_r}{\sum_{l=1}^{r} \sigma_l} > \tau \text{ then } ++r$
4. $\quad S^{(j+1)} = \text{shrink}(D - L^{(j+1)}, \lambda)$

FIG. 3

Inputs : observed video $D \in \mathbb{R}^{m \times n}$, regularization parameter $\lambda$, number of inner loops $iL$.
Initialization: $L + S = D(:, 1 : k_0)$, initial rank $r$,
$\quad [U_r, \Sigma_r, V_r] = \text{partialSVD}(L, r)$
for $k = k_0 + 1 : n$ do

1. $\quad [U_k, \Sigma_k, V_k] = \text{incSVD}(D(:, k), U_{k-1}, \Sigma_{k-1}, V_{k-1})$
   for $j = 1 : iL$ do
2. $\quad\quad L(:, k) = U_k(:, 1 : r) * \Sigma_k * (V_k(end, :)')$
3. $\quad\quad S(:, k) = shrink(D(:, k) - L(:, k), \lambda)$
4. $\quad\quad$ if $j == iL$ then break
5. $\quad\quad [U_k, \Sigma_k, V_k] = \text{repSVD}(D(:, k), S(:, k), U_k, \Sigma_k, V_k)$

FIG. 4

Inputs : observed video $D \in \Re^{m \times n}$, initial rank $r$
Initialization: $[U, \Sigma, V] = \text{thinQR}(D(:, 1 : r))$; $V = I_r$; $L(:, r) = U * \Sigma$;
for $k = r + 1 : n$ do

1     $[U, \Sigma, V, \eta] = \text{incrementalSVD}(D(:, k), U, \Sigma, V, r)$
2     $\zeta = \frac{\sum_{j=1} l \| L(:, k-j) - L(:, k) \|_2}{m}$
3     if ( $(\eta < \tau_{SVD})$ && $(\zeta < \tau_{DIST})$ ) then
       break;

FIG. 5

| Test Video | Grayscale | | Color | |
|---|---|---|---|---|
| | Average per frame (sec.) | FPS | Average per frame (sec.) | FPS |
| 160x128 | 0.0089 | 112.3 | 0.018 | 55 |
| 640x480 | 0.048 | 20.8 | 0.12 | 8 |
| 1920x1088 | 0.25 | 4 | 0.61 | 1.5 |

FIG. 6

| Test Video | Grayscale (average per frame in seconds) | | Color (average per frame in seconds) | |
|---|---|---|---|---|
| | standard Matlab | GPU-enabled Matlab | standard Matlab | GPU-enable Matlab |
| 352x224 | 0.39 | 0.27 | 0.63 | 0.37 |
| 640x480 | 1.49 | 0.6 | 2.45 | 0.82 |
| 1920x1088 | 10.20 | 2.9 | 18.04 | 5.46 |

FIG. 7

INCREMENTAL PRINCIPAL COMPONENT PURSUIT FOR VIDEO BACKGROUND MODELING

CROSS-REFERENCE TO RELATED APPLICATIONS

This application claims priority to U.S. Provisional Patent Application No. 62/003,152 filed May 27, 2014, U.S. Provisional Patent Application No. 62/037,685 filed Aug. 15, 2014, and U.S. Provisional Patent Application No. 62/067,904 filed Oct. 23, 2014.

STATEMENT REGARDING FEDERALLY SPONSORED RESEARCH OR DEVELOPMENT

This invention was made with government support under DE-AC52-06NA25396 awarded by the Department of Energy (DOE) National Nuclear Security Administration (NNSA) Los Alamos National Laboratory (LANL). The government has certain rights in the invention.

FIELD OF THE INVENTION

The invention relates generally to video modeling. More specifically, the invention relates to an incremental Principal Component Pursuit (PCP) method for video background modeling that obtains similar (quality) results to current classical (batch) PCP methods.

BACKGROUND

Automated video analysis systems are often required to process streaming video which is transmitted or received in an incremental fashion, with a new frame being transmitted or received at some constant rate. An important preprocessing step in many such systems is video background modeling. Background modeling is a technique for extracting moving objects in video frames. More specifically, video background modeling consists of segmenting the moving objects or "foreground" from the static ones or "background".

Streaming live video, such as in the case of sports, traffic, surveillance, etc., may utilize a popular method for video background modeling known as Principal Component Pursuit (PCP). The PCP optimization problem is defined by:

$$\arg\min_{L, S} \|L\|_* + \lambda \cdot \|S\|_1 \text{ s.t. } D = L + S \quad (1)$$

where $D \in \mathbb{R}^{m \times n}$ is the observed ratio of n frames, each of size $m = N_r \times N_c \times N_d$ (rows, columns, and depth or channels respectively), $L \in \mathbb{R}^{m \times n}$ is a low-rank matrix representing the background, $S \in \mathbb{R}^{m \times n}$ is a sparse matrix representing the foreground, $\|L\|_*$ is the nuclear norm of matrix L (i.e., $\Sigma_k |(\sigma_k(L))|$—the sum of the singular values of L, and $\|S\|_1$ is the $\ell^1$ norm of S (seen as a long vector).

Typically, current methods used to solve the PCP optimization problem (1) are based on splitting methods, such as the Augmented Lagrange Multiplier (ALM) method or its variants, in which the PCP problem (1) is solved via the problem:

$$\arg\min_{L, S, Y} \|L\|_* + \lambda \cdot \|S\|_1 + \langle Y, D - L - S \rangle + 0.5 \mu \cdot \|D - L - S\|_F$$

which includes a full or partial Singular Value Decomposition (SVD) depending on the ALM variant.

Certain current PCP-type methods include automated Recursive Projected CS (ReProCS), Grassmannian Robust Adaptive Subspace Tracking Algorithm (GRASTA), a smoothed $\ell_p$-norm Robust Online Subspace Tracking method (pROST) and Grassmannian Online Subspace Updates with Structured-sparsity (GOSUS). However, some of these include a batch initialization. Specifically, ReProCS is not a real-time algorithm, nor can it process real videos where multiple moving objects enter and leave the field of view of the camera. Moreover ReProCS assumes a known model for the motion of the video's moving objects, and uses a batch PCP method in its initialization step, which can be computationally costly.

GRASTA is presented as an "online" algorithm for low-rank subspace tracking: it uses a reduced number of frames compared to the PCP problem (1), to estimate an initial low-rank sub-space representation of the background and then processes each frame (which can be spatially sub-sampled) at a time. It must be emphasized that this procedure is not fully incremental, using a time sub-sampled version of all the available frames for initialization. Although GRASTA can estimate and track non-stationary backgrounds, its initialization step can have a relatively high complexity.

pROST is very similar to the GRASTA algorithm, but instead of using an $\ell_1$ norm of the singular values to estimate the low-rank sub-space representation of the background it uses an $\ell_p$ norm (p<1). It has been shown that pROST can outperform GRASTA in the case of dynamic backgrounds.

Similarly, GOSUS is also closely related to GRASTA, however GOSUS enforces structured/group sparsity on the sparse component and uses a small number of frames from the initial part of the video to be analyzed for its batch initialization stage, and then proceeds to update the background. Although GOSUS is known to have better tracking properties than GRASTA, its computational cost is higher. Furthermore computational results suggest that its complexity does not depend linearly with the number of pixel in the analyzed video frame, but it is influenced by the number of moving objects.

While PCP is currently considered to be a superior method for video background modeling, it suffers from a number of limitations including, high computational cost, batch processing, and sensitivity to camera jitter.

The high computational cost is dominated by a partial Singular Value Decomposition (SVD) computation at each major outer loop, with a cost of O(m·n·r) where r=rank(L).

Batch processing requires a large number of frames before any processing can begin including significant overhead of memory transfers due to the typical size of matrix D. For example, in the case of a 400 frame (13.3 seconds at 30 fps) 640×480 color video, the size of D is 921600×400, equivalent to 2.95 giga-bytes (Gb) in double floating-point representation. Likewise in the case of a 900 frame (36 seconds at 25 fps) 1920×1088 (HD) color video, the size of D is 6266880×900, equivalent to 45.12 Gb in double floating-point representation.

Furthermore, most PCP algorithms, either batch or online, have a high sensitivity to camera jitter which can affect airborne and space-based sensors as well as fixed ground-based cameras subject to wind. In this context, Robust Alignment by Sparse and Low-rank decomposition (RASL) and Transformed Grassmannian robust adaptive subspace tracking algorithm (t-GRASTA) are known to be robust to camera jitter, however RASL is a batch method whereas t-GRASTA is no fully incremental, needing a batch and computationally expensive initialization.

Moreover, RASL was introduced as a batch PCP method able to handle misaligned video frames by solving $$\underset{L, S, \tau}{\arg\min} \|L\|_* + \lambda \cdot \|S\|_1 \text{ s.t. } \tau \circ \tau(D) = L + S$$

where $\tau(\cdot) = \{\tau_k(\cdot)\}$ is a set of independent transformations (one per frame), each having a parametric representation, such that $\tau(D)$ aligns all the observed video frames. RASL handles the non-linearity of the previous equation via $$\underset{L, S, \tau}{\arg\min} \|L\|_* + \lambda \cdot \|S\|_1 \text{ s.t. } \tau(D) + \sum_{k=1}^{n} J_k \Delta \tau_k \varepsilon_k = L + S$$

where $J_k$ is the Jacobian of frame k with respect to transformation k and $\varepsilon_k$ denotes the standard basis for real numbers. RASL's computational results mainly focus on rigid transformations; it is also known that as long as the initial misalignment is not too large, RASL effectively recovers the correct transformations.

Thus, there is a need for an improved, more efficient method for video background modeling than current existing methods. The invention satisfies this need.

SUMMARY OF THE INVENTION

The invention is directed to Principal Component Pursuit (PCP) method for video background modeling that obtains similar (quality) results to current classical (batch) PCP algorithms using an incremental fashion—referred to as an incremental PCP. The incremental PCP method according to the invention processes one frame at a time in contrast to current batch processing. In addition, the invention delivers a consistent sparse approximation when the input video suffers from jitter—both translational and rotational.

One advantage of the invention is that the incremental PCP has an extremely low memory footprint: $O(3 \cdot m \cdot r)$. In embodiments of the invention that account for jitter sensitivity, the low memory footprint is $O(3 \cdot m \cdot r) + O(4 \cdot m)$.

Another advantage of the invention is that it has a computational complexity that allows for real-time processing. The incremental principal component pursuit algorithm is executed real-time to deliver computational demand. The computation cost is $O(14 \cdot m \cdot r)$ per frame. In embodiments of the invention that account for jitter sensitivity, the computational complexity is $O(14 \cdot m \cdot r) + O(15 \cdot N_c \cdot N_r (2 \cdot \log_2 (N_r) + \log_2 (N_c)))$ per frame per inner loop.

Another advantage of the invention is that since the core operations of the incremental PCP method are rank-1 modifications—either update, replace or downdate—can track changes of the background.

The invention and its attributes and advantages may be further understood and appreciated with reference to the detailed description below of one contemplated embodiment, taken in conjunction with the accompanying drawings.

DESCRIPTION OF THE DRAWING

The accompanying drawings, which are incorporated in and constitute a part of this specification, illustrate an implementation of the invention and, together with the description, serve to explain the advantages and principles of the invention:

FIG. 3 illustrates an alternating minimization fast PCP (amFastPCP) method according to the invention.

FIG. 4 illustrates an incremental PCP method according to the invention.

FIG. 5 illustrates an alternative initialization procedure according to the invention.

FIG. 6 illustrates a table summarizing the performance of the incremental PCP according to the invention.

FIG. 7 illustrates a table summarizing the performance of the incremental PCP including a jitter sensitivity invariant according to the invention.

DETAILED DESCRIPTION OF THE INVENTION

Figure 1:
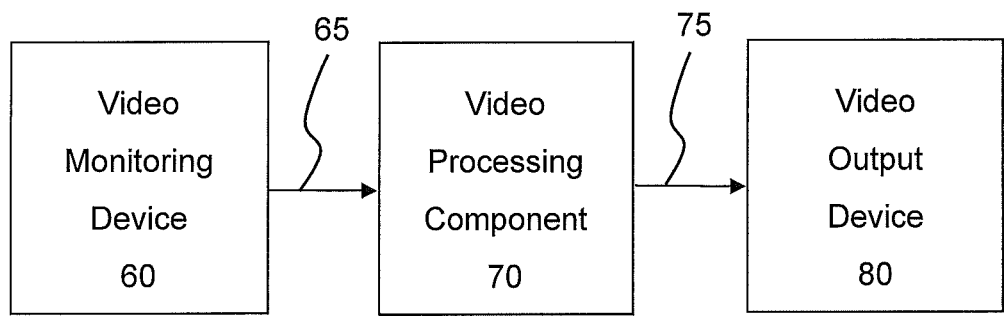
FIG. 1 illustrates a block diagram of a system according to one embodiment of the invention.

FIG. 1 illustrates a block diagram of a system 50 according to one embodiment of the invention. The invention may be used with any application that involves video monitoring such as automatic video analysis (sports, traffic, etc.), surveillance systems including for example baby monitoring systems.

As shown in FIG. 1, a video monitoring device 60 captures video and sends the video signal 65 to a video processing device 70. The video processing device 70 processes the signal according to the invention. The processed video signal 75 is provided to a video output device 80 for display. It is contemplated that the video processing device 70 may be a stand-alone device or integrated with either the video monitoring device 60 or the video output device 80. The video monitoring device may be any device that captures video signals such as a camera. A video output device may be any device that enables display of the processed video signals, for example a camera, handheld device, portable phone, etc.

Figure 2:
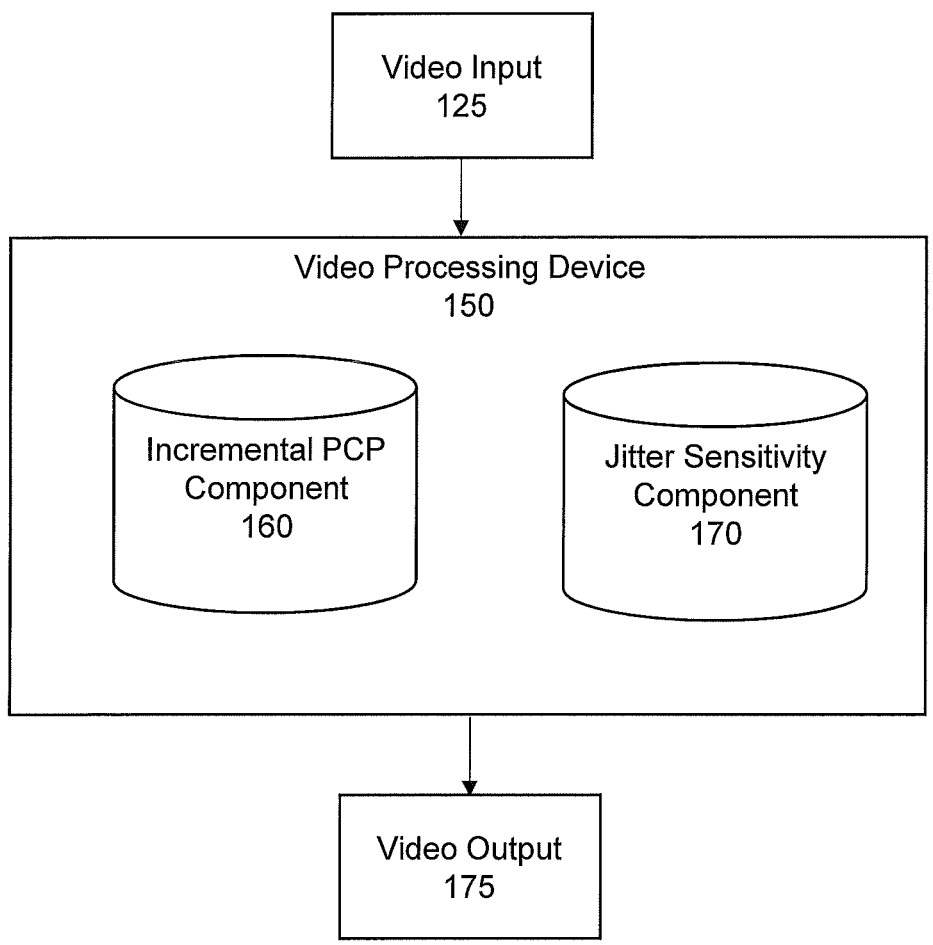
FIG. 2 illustrates a block diagram of a method for video background modeling according to one embodiment of the invention.

FIG. 2 illustrates a block diagram of a method for video background modeling according to one embodiment of the invention. An video input signal 125 is received by the video processing device 150. The video input signal may be a sequence comprising a plurality of frames. The video processing device 150 includes a processor that executes the principal component pursuit algorithm according to the invention. More specifically, the video processing device 150 includes an incremental PCP component 160 and a jitter sensitivity component 170. The incremental PCP component 160 estimates a low-rank approximation of a background of the input video sequence 125. The incremental PCP component 160 segments foreground objects from background objects appearing in the input video sequence 125 by processing the input video sequence in an incremental fashion. The computational complexity of each frame of the input video sequence is $O(8 \cdot m \cdot r) + O(r^3)$, where $m = N_r$ (frame rows)$\times N_c$ (frame columns)$\times N_d$ (frame depth or channels), r is the rank of a matrix that represents the background. The processed input video sequence is displayed as output video 175 with improved background.

Fast alternating minimization PCP (amFastPCP) along with incremental and rank-1 modifications for the thin Singular Value Decomposition (SVD) are used to develop the incremental PCP method according to the invention.

Instead of solving the PCP optimization problem (1) directly, the amFastPCP method solves the equivalent alternating minimization:

$$L^{(j+1)} = \underset{L}{\arg\min} \|L + S^{(j)} - D\|_F^2 \text{ s.t. } \text{rank}(L) = r \quad (2)$$

$$S^{(j+1)} = \underset{S}{\arg\min} \|L^{(j+1)} + S - D\|_F^2 + \lambda \|S\|_1 \quad (3)$$

which is summarized in FIG. 3. As shown in FIG. 3, lines 1 and 2 relate to sub-problem (2) above and lines 3 and 4 relate to sub-problem (3) above.

The sub-problem (2) is solved by computing a partial SVD of $D-S^{(j)}$ with r components, which is the only computationally demanding portion of the algorithm. This requires $O(m \cdot n \cdot r)$ and $O(2 \cdot m \cdot n \cdot r)$ flops per outer loop respectively. The solution to sub-problem (3) is simple elementwise shrinkage (soft thresholding): shrink $(D-L^{(j+1)}, \lambda)$, where shrink $(x, \epsilon) = \text{sign}(x) \max\{0, |x|-\epsilon\}$.

It is noted that lines 1 and 2, or sub-problem (2), are the ones that impose the "batch" property of the amFastPCP algorithm, as well as its memory requirements ($O(2 \cdot m \cdot n)$).

The solution obtained via the iterative solution of (2)-(3) is of comparable quality to the solution of the original PCP problem (1), being approximately an order of magnitude faster than the inexact ALM algorithm to construct a sparse component of the same quality.

Incremental and rank-1 modifications for the thin Singular Value Decomposition (SVD) are used. Given a matrix $D \in \mathbb{R}^{m \times l}$ with thin SVD $D = U_0 \Sigma_0 V_0^T$ where $\Sigma_0 \in \mathbb{R}^{r \times r}$, and column vectors a and b (with m and l elements respectively, it is noted that:

$$D + ab^T = [U_0 a] \begin{bmatrix} \Sigma_0 & 0 \\ 0^T & 1 \end{bmatrix} [V_0 b]^T \quad (4)$$

where 0 is a zero column vector of the appropriate size. Following is an incremental (thin) SVD and rank-1 modification (downdate and replace) for thin SVD.

The generic operation consisting of Gram-Schmidt orthonormalization of a and b w.r.t. $U_0$ and $V_0$, i.e., $$x = U_0^T a, \, z_x = a - Ux, \, \rho_x = \|z_x\|_2,$$

$$p = \frac{1}{\rho_x} z_x \text{ and } y = V_0^T b,$$

$$z_y = b - Vy, \, \rho_y = \|z_{xy}\|_2, \, q = \frac{1}{\rho_y} z_y$$

is used as a first step for all the cases described below.

Incremental or Update Thin SVD:
Given $d \in \mathbb{R}^{m \times 1}$ thin SVD is computed SVD ([D d])$=U_1 \Sigma_1 V_1^T$ with (i) $\Sigma_1 \in \mathbb{R}^{r+1 \times r+1}$ or (ii) $\Sigma_1 \in \mathbb{R}^{r \times r}$. It is noted that [D 0]$=U_0 \Sigma_0 [V_0 \ 0]^T$ and that [D d]=[D 0]+$de^T$, where e is a unit vector (with l+1 om this case). Therefore, Equation (4) above is equivalent to (5) and (6) below where $\hat{\Sigma} \in \mathbb{R}^{r+1 \times r+1}$.

$$[D \ 0] + de^T = [U_0 p] \cdot (G \hat{\Sigma} H^T) \cdot \begin{bmatrix} V_0^T & 0 \\ 0^T & 1 \end{bmatrix} \quad (5)$$

$$G \hat{\Sigma} H^T = SVD \left( \begin{bmatrix} \Sigma_0 & x \\ 0^T & \rho_x \end{bmatrix} \right) \quad (6)$$

Using (7) below, SVD ([D d]) is obtained with (i) $\Sigma_1 \in \mathbb{R}^{r+1 \times r+1}$. Similarly, using (8) below, SVD ([D d]) is obtained with (ii) $\Sigma_1 \in \mathbb{R}^{r \times r}$.

$$U_1 = [U_0 p] \cdot G, \, \Sigma_1 = \hat{\Sigma}, \, V_1 = \begin{bmatrix} V_0^T & 0 \\ 0^T & 1 \end{bmatrix} \cdot H \quad (7)$$

$$U_1 = U_0 \cdot G(1{:}r, 1{:}r) + p \cdot G(r+1, 1{:}r), \quad (8)$$

$$\Sigma_1 = \hat{\Sigma}(1{:}r, 1{:}r), \, V_1 = [V_0 \cdot H(1{:}r, 1{:}r); H(r+1, 1{:}r)]$$

Downdate Thin SVD:
Given [D d]$=U_0 \Sigma_0 V_0^T$ with $\Sigma_0 \in \mathbb{R}^{r \times r}$, thin SVD is computed SVD(D)$=U_1 \Sigma_1 V_1^T$ with r singular values. Noting that [D 0]=[D d]+$(-d)e^T$ then the rank-1 modification (4) is equivalent to (9) and (10) below:

$$[D \ d] + (-d)e^T = [U_0 \ 0] \cdot (G \hat{\Sigma} H^T) \cdot [V_0 \ q]^T \quad (9)$$

$$G \hat{\Sigma} H^T = SVD \left( \begin{bmatrix} \Sigma_0 - \Sigma_0 yy^T & -\rho_y \cdot \Sigma_0 y \\ 0^T & 0 \end{bmatrix} \right) \quad (10)$$

from which thin SVD(D) is computed using (11) below:

$$U_1 = U_0 \cdot G(1{:}r, 1{:}r),$$

$$\Sigma_1 = \hat{\Sigma}(1{:}r, 1{:}r), V_1 = V_0 \cdot H(1{:}r, 1{:}r) + q \cdot H(r+1, 1{:}r) \quad (11)$$

Thin SVD Replace:
Given [D d]$=U_0 \Sigma_0 V_0^T$ with $\Sigma_0 \in \mathbb{R}^{r \times r}$, thin SVD is computed SVD([D $\hat{d}$])$=U_1 \Sigma_1 V_1^T$ with r singular values. This case is understood as a mixture of the above previous cases and is easily derived noticing that [D $\hat{d}$]=[D d]+$(\hat{d}-d)e^T$.

The computational complexity of any of the procedures discussed above is upper bounded by $O(10 \cdot m \cdot r) + O(r^3) + O(3 \cdot r \cdot l)$. If $r \ll m, l$ holds, then the complexity is dominated by $O(10 \cdot m \cdot r)$.

According to the invention, the incremental PCP method assumes that the following have been computed: $L_{k_0}$ (low-rank) and $S_{k_0}$ (sparse), where $L_{k_0} S_{k_0} = D_{k_0}$ and $D_{k_0} = D(:,1,k_0)$. It is also assumed that the partial (thin) SVD is known $L_{k_0} = U_r \Sigma_r V_r^T$, where $\Sigma_r \in \mathbb{R}^{r \times r}$. This is easily done by solving the batch PCP problem for $D_{k_0}$ using any algorithm, however for purposes of this invention, it is carried out using the amFastPCP algorithm (see FIG. 3). Alternative procedures are contemplated on how to find such initialization as discussed more fully below in reference to FIG. 5.

If the PCP problem is solved from scratch when the next frame $d_k = (k+k_0+1)$ is available via the amFastPCP algorithm, then the following is minimized:

$$\tfrac{1}{2} \|L_k + S_k - D_k\|_F^2 + \lambda \|S_k\|_1 \text{ s.t. } \text{rank}(L_k) = r \quad (12)$$

where $L_k = [L_{k_0} \ l_k], \, S_k = [S_{k_0} \ S_k], \, D_k = [D_{k_0} \ d_k]$.

The solution of (12) is computed via (2)-(3); when j=0 the minimizer of (2) is given by:

$$L_k^{(1)} = \text{partialSVD}(D_k - S_k^{(0)}) \quad (13)$$

noting that $D_k-S_k^{(0)}=[D_{k_0}-S_{k_0}\ d_k]=[L_{k_0}\ d_k]$, then (13) is computed via the incremental thin SVD procedure (non-increasing rank) described above since $L_{k_0}=U_r\Sigma_r V_r^T$ is known. The minimizer of (3) or shrinkage step is only applied to the current estimate since $S_{k_0}$ is known—e.g., $s_k^{(1)}$=shrink $(d_k-1_k^{(1)})$, where $1_k^{(1)}$ is the last column of the current estimate $L_k^{(1)}$.

For the next iteration (j=1) a similar situation is noted: $D_k-S_k^{(1)}=[D_{k_0}-S_{k_0}\ d_k-S_k^{(1)}]$, whose partial SVD is effectively computed using the thin SVD replace procedure (non-increasing rank) described above, since in the previous step (j=0) the partial SVD for $[D_{k_0}-S_{k_0}\ d_k]$ is computed. The incremental PCP algorithm is shown in FIG. 4. Specifically, incSVD(·) and repSVD(·) as shown in FIG. 4 refer to the procedures described above.

As shown in FIG. 4, the algorithm assumes that the background does not change, or changes slowly. However in a real scenario this condition does not hold for long; in this case the downdate procedure discussed above is used to "forget" the background frames that are "too old" and always keep a low-rank estimate of a more or less constant background, resulting in a "sliding window" incremental PCP algorithm.

In certain embodiments of the invention, the batch PCP computation described in the "initialization" of FIG. 4 may be replaced by an alternative initialization procedure. One example of an alternative initialization procedure is a fully incremental initialization procedure as shown in FIG. 5.

Assuming that r, the rank of the low-rank matrix is known (usually r∈[2,8] is adequate for real videos acquired with a static camera), then the following is used to obtain an estimate of the low-rank approximation of the first $k_0$ frames of the input video:

Compute $[U,\Sigma]$=thinQR(D(:,1)), set V=$I_1$, where thinQR (·) represents the thin QR decomposition.
Compute $[U,\Sigma,V]$=incSVD(D(:,k),U,$\Sigma$,V) for k∈[2,r], the rank increasing thin SVD as described above.
Compute $[U,\Sigma,V]$=incSVD(D(:,k),U,$\Sigma$,V) for k∈[r+1,$k_0$], the non-increasing rank thin SVD as described above.

If this initial estimate needs to be improved, a second pass (or several passes) is performed using the thin SVD replace operation as described above. This would be similar to perform the operations listed in lines 2-5 in the algorithm shown in FIG. 4 but applied to the first $k_0$ frames.

In one embodiment, $k_0$=30 has been determined is a lower bound to obtain good results; for this initialization stage, it has been heuristically found that using a temporal sub-sampled—lower frame per second (fps) rate—improves the background estimation. Likewise, for this procedure using even just one pass gives good results as discussed below.

Three video sets are used as test videos. The first video set is a 160×128 pixel, 1546-frame grayscale video sequence of 61.8 seconds at 25 fps., from a lobby with highly variable lighting. A second video set is a 640×480 pixel, 400-frame color video sequence of 26.66 seconds at 15 fps, from a traffic surveillance dataset. The third video set is a 1920×1088 pixel, 900-frame color video sequence of 36 seconds at 25 fps, from a public space surveillance dataset. Since the incremental PCP behaves in practice as a "sliding window" incremental PCP (size $k_0$=30), using rank equal to one suffices to have a good background estimate as well as to have good tracking properties. FIG. 6 is a table summarizing the performance of the incremental PCP according to the invention as applied to the three video sets.

According to the invention, the incremental PCP is robust to translational and rotational jitter, referred to as "jitter sensitivity". Jitter sensitivity of the incremental PCP is addressed by incrementally solving:

$$\min_{L,S,T} \frac{1}{2}\|D-T(L)-S\| + \lambda\|S\|_1 \text{ s.t. } \text{rank}(L)=r \quad (14)$$

where it is assumed that the observed frames D are misaligned due to camera jitter, the low-rank representation, L, is properly aligned, and that T={$T_K$} is a set of invertible and independent transformations such that when applied to each frame D=T(L)+S is satisfied. $T_K$ represents a rigid transformation, i.e., the video monitoring device used to acquire the video suffers from translational and rotational jitter. Furthermore, it is worth noting that (i) in contrast with RASL and t-GRASTA that use $$\arg\min_{L,S,\tau} \|L\|_* + \lambda \cdot \|S\|_1 \text{ s.t. } \tau\ \tau(D)=L+S,$$

the transformation T={$T_K$} in (14) is applied to the low-rank (background) component, instead of being applied to the observed video D and (ii) that the relationship between T and τ is that one is the inverse of the other.

It is assumed that objects of interest are at specific distance from the video monitoring device, such as a camera, that the observed frame $d_k$, which suffers from jitter, is modeled as a random rigid transformation with respect to un-observed jitter-free frame. Under this assumption, Equation (14) is represented as:

$$\arg\min_{L,S,H,\alpha} \frac{1}{2}\Sigma_k \|h_k * R(l_k, \alpha_k) + s_k - d_k\|_F^2 + \quad (15)$$

$$\lambda\|S\|_1 + \gamma\Sigma_k\|h_k\| \text{ s.t. } \text{rank}(L)=r$$

where H represents the set of filters {$h_k$} which models the translational jitter, and α represents the set of angles {$\alpha_k$} that models the rotational jitter. Equation (15) is incrementally solved via the alternating minimization:

$$\arg\min_{h_k} \frac{1}{2}\|h_k * R(l_k^{(j)}, \alpha_k^{(j)}) + s_k^{(j)} - d_k\|_F^2 + \gamma\|h_k\|_1, \quad (16)$$

$$\arg\min_{\alpha_k} \frac{1}{2}\|h_k^{(j+1)} * R(l_k^{(j)}, \alpha_k) + s_k^{(j)} - d_k\|_F^2, \quad (17)$$

$$\arg\min_{l_k} \frac{1}{2}\|h_k^{(j+1)} * R(l_k, \alpha_k^{(j+1)}) + s_k^{(j)} - d_k\|_F^2 \text{ s.t. } \text{rank}(L_k) = \quad (18)$$

$$r\ L_k=[l_1, l_2, \ldots l_k]$$

$$\arg\min_{s_k} \frac{1}{2}\|h_k^{(j+1)} * R(l_k^{(j+1)}, \alpha_k^{(j+1)}) + s_k^{(j)} - d_k\|_F^2 + \gamma\|s_k\|_1 \quad (19)$$

Sub-problems (16), (17) and (19) are simple to handle whereas the solution to sub-problem (15) is just element-wise shrinkage shrink (x, ϵ)=sign(x) max{0, |x|−ϵ}. Sub-problem (18) is not as straight forward as the other sub-problems; however, by noting that (i) the adjoint operator of rotation R(•,$\alpha_k$) is R(•,−$\alpha_k$) and (ii) the adjoint operator of the translation represented by filter $h_k(x,y)$ is the filter $h_k(-x,-y)$, then (18) can be effectively solved using an iterative hard thresholding (IHT) based algorithm.

Three video sets are used as test videos. The first video set is a 352×224 pixel, 1200-frame color video sequence of 40 seconds at 30 fps, from a surveillance camera with real (mainly translational) jitter. The second video set is a 640×480 pixel, 400-frame color video sequence of 26.66 seconds at 15 fps, from a traffic surveillance dataset. The third video set is a 1920×1088 pixel, 900-frame color video sequence of 36 seconds at 25 fps, from the a public space dataset. FIG. 7 illustrates a table summarizing the performance of the incremental PCP including a jitter sensitivity invariant according to the invention when run on an Intel i7-4710HQ quad-core (2.5 GHz, 6 MB Cache, 32 GB RAM) based laptop with a NVIDIA GTX980M GPU card, in this case we show the performance for two variants: (i) a standard single-thread Matlab and (ii) another that uses GPU-enabled Matlab functions.

Figure 8:
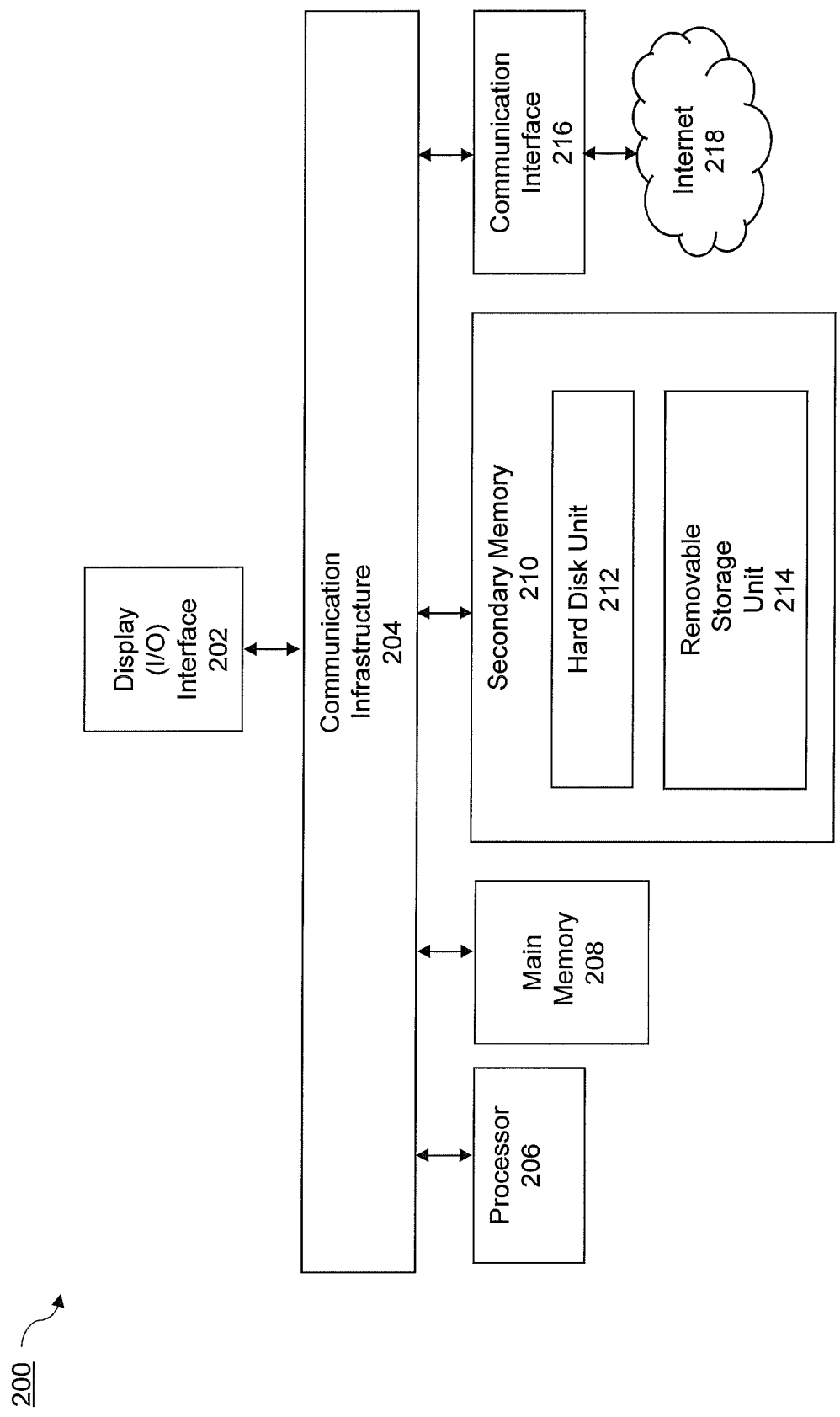
FIG. 8 illustrates an exemplary computer system that may be used to implement the programs according to the invention.

FIG. 8 illustrates an exemplary computer system that may be used to implement the programs according to the invention. For example, an Intel i7-2670QM quad-core (2.2 GHz, 6 MB Cache) or an Intel i7-4710HQ quad-core (2.5 GHz, 6 MB Cache, 32 GB RAM) based computing device. One or more computer systems 200 may be used to implement the methods according to the invention, for example as computer code.

Computer system 200 includes an input/output display interface 202 connected to communication infrastructure 204—such as a bus—that forwards data including graphics, text, and information, from the communication infrastructure 204 to other components of the computer system 200. The input/output display interface 202 may be, for example, a display device, a keyboard, touch screen, joystick, trackball, mouse, monitor, speaker, printer, Google Glass® unit, web camera, any other computer peripheral device, or any combination thereof, capable of entering and/or viewing data. Computer system 200 includes one or more processors 206, which may be a special purpose or a general-purpose digital signal processor configured to process certain information. Computer system 200 also includes non-transitory computer-readable storage medium such as a main memory 208, for example random access memory ("RAM"), read-only memory ("ROM"), mass storage device, or any combination thereof. Computer system 200 may also include a secondary memory 210 such as a hard disk unit 212, a removable storage unit 214, or any combination thereof. Computer system 200 may also include a communication interface 216, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc to enable communication with the Internet 218.

It is contemplated that the main memory 208, secondary memory 210, communication interface 216, or a combination thereof, function as a non-transitory computer-readable storage medium to store and/or access computer software including computer instructions. Certain embodiments of a computer readable storage medium do not include any transitory signals or waves. For example, computer programs or other instructions may be loaded into the computer system 200 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 214 or hard disc unit 212 to the secondary memory 210 or through the communication infrastructure 204 to the main memory 208 of the computer system 200.

Communication interface 216 allows software, instructions and data to be transferred between the computer system 200 and external devices or external networks such as the Internet 218. Software, instructions, and/or data transferred by the communication interface 216 are typically in the form of signals that may be electronic, electromagnetic, optical or other signals capable of being sent and received by the communication interface 216. Signals may be sent and received using wire or cable, fiber optics, a phone line, a cellular phone link, a Radio Frequency ("RF") link, wireless link, or other communication channels.

Computer programs, when executed, enable the computer system 200, particularly the processor 206, to implement the methods of the invention according to computer software including instructions.

The computer system 200 described herein may perform any one of, or any combination of, the steps of any of the methods presented herein. It is also contemplated that the methods according to the invention may be performed automatically, or may be invoked by some form of manual intervention.

The invention is also directed to computer products, otherwise referred to as computer program products. Computer products store software on any computer useable medium, known now or in the future. Such software, when executed, may implement the methods according to certain embodiments of the invention.

The computer system 200 of FIG. 2 is provided only for purposes of illustration, such that the invention is not limited to this specific embodiment. It is appreciated that a person skilled in the relevant art knows how to program and implement the invention using any computer system including a cloud computer system.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A computer system method for video background modeling including an incremental principal component pursuit algorithm comprising a low computational cost executed by a processor, the method comprising the steps of:
   providing the incremental principal component pursuit algorithm with the low computational cost $O(14 \cdot m \cdot r) + O(15 \cdot N_c \cdot N_r (2 \cdot \log_2(N_r) + \log_2(N_c)))$ per frame per inner loop;
   receiving an input video sequence comprising a plurality of frames;
   estimating a low-rank approximation of a background of the input video sequence;
   segmenting foreground objects from background objects appearing in the input video sequence by processing the input video sequence in an incremental fashion to obtain a processed input video sequence, wherein a computational complexity of each frame of the input video sequence is $O(8 \cdot m \cdot r) + O(r^3)$, where $m = N_r$ (frame rows)$\times N_c$ (frame columns)$\times N_d$ (frame depth or channels), and r is the rank of a matrix that represents the background; and displaying the processed input video sequence to obtain an output video sequence.

2. The computer system method for video background modeling including an incremental principal component pursuit algorithm executed by a processor according to claim 1, wherein the incremental principal component pursuit algorithm comprises a low memory footprint.

3. The computer system method for video background modeling including an incremental principal component pursuit algorithm executed by a processor according to claim 2, wherein the low memory footprint is $O(3 \cdot m \cdot r)$.

4. The computer system method for video background modeling including an incremental principal component pursuit algorithm executed by a processor according to claim 2, wherein the low memory footprint is $O(3 \cdot m \cdot r) + O(4 \cdot m)$.

5. The computer system method for video background modeling including an incremental principal component pursuit algorithm executed by a processor according to claim 1, wherein the low computational cost is $O(14 \cdot m \cdot r)$ per frame.

6. The computer system method for video background modeling including an incremental principal component pursuit algorithm executed by a processor according to claim 1, wherein the incremental fashion is one frame at a time.

7. A computer system method for video background modeling including executed by a processor, the method comprising the steps of:
   providing an incremental principal component pursuit algorithm comprising a low computational cost, wherein the low computational cost is one of: $O(14 \cdot m \cdot r) + O(15 \cdot N_c \cdot N_r (2 \cdot \log_2(N_r) + \log_2(N_c)))$ per frame per inner loop and $O(14 \cdot m \cdot r)$ per frame;
   receiving an input video sequence comprising a plurality of frames;
   estimating a low-rank approximation of a background of the input video sequence;
   segmenting foreground objects from background objects appearing in the input video sequence by processing the input video sequence in an incremental fashion to obtain a processed input video sequence, wherein a computational complexity of each frame of the input video sequence is $O(8 \cdot m \cdot r) + O(r3)$, where $m = N_r$ (frame rows)$\times N_c$ (frame columns)$\times N_d$ (frame depth or channels), and r is the rank of a matrix that represents the background; and
   displaying the processed input video sequence to obtain an output video sequence.

8. The computer system method for video background modeling including an incremental principal component pursuit algorithm executed by a processor according to claim 7, wherein the incremental principal component pursuit algorithm comprises a low memory footprint.

9. The computer system method for video background modeling including an incremental principal component pursuit algorithm executed by a processor according to claim 8, wherein the low memory footprint is $O(3 \cdot m \cdot r)$.

10. The computer system method for video background modeling including an incremental principal component pursuit algorithm executed by a processor according to claim 8, wherein the low memory footprint is $O(3 \cdot m \cdot r) + O(4 \cdot m)$.

11. The computer system method for video background modeling including an incremental principal component pursuit algorithm executed by a processor according to claim 7, wherein the incremental fashion is one frame at a time.

* * * * *